(12) United States Patent
Wood et al.

(10) Patent No.: US 7,661,382 B2
(45) Date of Patent: Feb. 16, 2010

(54) REVERSIBLE SEAT FOR A BOAT

(75) Inventors: Scott D. Wood, Knoxville, TN (US); Chadrick E. Curts, Louisville, TN (US)

(73) Assignee: Mastercraft Boat Company, LLC., Vonore, TN (US)

( * ) Notice: Subject to any disclaimer, the term of this patent is extended or adjusted under 35 U.S.C. 154(b) by 149 days.

(21) Appl. No.: 12/117,198

(22) Filed: May 8, 2008

(65) Prior Publication Data

US 2009/0277372 A1  Nov. 12, 2009

(51) Int. Cl.
*B63B 17/00* (2006.01)
*A47C 13/00* (2006.01)
*A47C 7/00* (2006.01)
*B60N 2/32* (2006.01)

(52) U.S. Cl. .................. 114/363; 297/64; 297/283.1; 297/283.3

(58) Field of Classification Search ............... 114/343, 114/363; 296/63; 297/283.1, 283.3, 64
See application file for complete search history.

(56) References Cited

U.S. PATENT DOCUMENTS

| 684,747 | A | * | 10/1901 | Cole ........................ 297/94 |
| 692,333 | A | * | 2/1902 | Mathews .................... 297/94 |
| 1,178,285 | A | * | 4/1916 | Adams ....................... 297/97 |
| 1,465,925 | A | | 8/1923 | Steel |
| 2,383,178 | A | * | 8/1945 | Edwards .................... 114/363 |
| 3,964,785 | A | | 6/1976 | Plume |
| 4,470,629 | A | * | 9/1984 | Collins, Jr. .................. 297/64 |
| 6,578,854 | B2 | * | 6/2003 | Wucherpfennig et al. ... 180/330 |
| 6,715,825 | B2 | | 4/2004 | Tame |

* cited by examiner

*Primary Examiner*—Daniel V Venne
(74) *Attorney, Agent, or Firm*—Fitzpatrick, Cella, Harper & Scinto (57) ABSTRACT

A reversible seat for a boat or other vehicle includes a base, a seat bottom, and a seat back. The seat bottom, which has a first surface and a second, opposite surface, is pivotally connected to the base such that the seat bottom is capable of rotating at least approximately 180 degrees about the base. The seat back is pivotally connected to the seat bottom on a side of the seat bottom opposite from where the seat bottom is pivotally connected to the base. In a first seat position, the first surface of the seat bottom faces substantially upward and the second surface of the seat bottom faces substantially downward. In a second seat position, the second surface of the seat bottom faces substantially upward and the first surface of the seat bottom faces substantially downward. In each of the first and second seat positions, the seat back extends upward at a predetermined angle relative to the seat bottom.

20 Claims, 9 Drawing Sheets

REVERSIBLE SEAT FOR A BOAT

FIELD OF THE INVENTION

This invention relates to a reversible seat for a boat or other vehicle.

BACKGROUND OF THE INVENTION

As is well known, sport boats are often used to tow water sports performers, such as water skiers, wakeboarders, and the like. Such boats typically include a driver's seat and seating for one or more passengers. Each passenger's seat usually is fixed so as to face one of the forward, backward, or sideways directions. As a result, passengers may have to contort themselves or change seats in order to look forward while cruising and backward while watching a water sports performer.

SUMMARY OF THE INVENTION

The present invention relates to a reversible seat that allows a passenger to sit comfortably while facing either of two opposite directions. The reversible seat is capable of being used in any type of vehicle, and is especially suited for use in a boat.

In one aspect, the invention relates to a reversible seat that is capable of assuming at least a first position and a second position. Thus, for example, the first seat position might face forward, while the second seat position might face backward. Or, perhaps, the first seat position might face out the left side of the vehicle, while the second seat position might face out the right side of the vehicle.

The reversible seat includes, in main part, a base, a seat bottom, and a seat back. The seat bottom has a first surface and a second, opposite surface, and is pivotally connected to the base such that the seat bottom is capable of rotating at least approximately 180 degrees about the base. The seat back is pivotally connected to the seat bottom on a side of the seat bottom opposite from where the seat bottom is pivotally connected to the base. In the first seat position, the first surface of the seat bottom faces substantially upward and the second surface of the seat bottom faces substantially downward. In the second seat position, the second surface of the seat bottom faces substantially upward and the first surface of the seat bottom faces substantially downward. In each of the first and second seat positions, the seat back extends upward at a predetermined angle relative to the seat bottom.

In the first seat position, the seat bottom preferably is oriented substantially horizontally (i.e., substantially parallel to the floor of the boat or other vehicle) and the predetermined angle between the seat bottom and the seat back is in the range of approximately 90 to 135 degrees, and more preferably in the range of approximately 95 to 115 degrees. In the second seat position, the seat bottom preferably is oriented substantially horizontally and is rotated approximately 180 degrees about the base from its orientation in the first position, and the predetermined angle between the seat bottom and the seat back is in the range of approximately 90 to 135 degrees, and more preferably in the range of about 95 to 115 degrees.

The reversible seat preferably includes means for releasably maintaining the predetermined angle of the seat back relative to the seat bottom in each of the first and second seat positions. In a preferred embodiment, the means for releasably maintaining the angle of the seat back relative to the seat bottom includes at least one cammed surface on the seat bottom, at least one cammed surface on the seat back, and at least one slide-and-pivot connection between the seat bottom and the seat back. The cammed surfaces of the seat bottom and the seat back engage each other to maintain the predetermined angle between the seat bottom and the seat back in each of the first and second seat positions. In order to move the seat from the first position to the second position, or vice versa, the seat back must first be lifted upward before being rotated relative to the seat bottom.

Optionally, in addition to the first and second seat positions, the seat is capable of assuming a third seat position in which the seat bottom is oriented the same as it is in the first seat position, and the seat back extends upward at a predetermined angle relative to the seat bottom in the range of approximately 45 to 90 degrees. The seat may be further capable of assuming a fourth seat position in which both the seat bottom and the seat back are rotated approximately 130 degrees about the base from their respective orientations in the third seat position.

In another aspect, the invention relates to a reversible seat especially suited for use in a boat. The seat is capable of assuming at least a forward-facing position and an aft-facing position. The seat includes a base, a seat bottom pivotally connected to the base, and a seat back pivotally connected to the seat bottom on a side of the seat bottom opposite from where the seat bottom is pivotally connected to the base. In the forward-facing position, the seat bottom is oriented substantially horizontally and the seat back extends upward at a predetermined angle relative to the seat bottom in the range of approximately 90 to 135 degrees, and more preferably in the range of approximately 95 to 115 degrees. In the aft-facing position, the seat bottom is oriented substantially horizontally and is rotated approximately 180 degrees about the base from its orientation in the forward-facing position, and the seat back extends upward at a predetermined angle relative to the seat bottom in the range of approximately 90 to 135 degrees, and more preferably in the range of approximately 95 to 115 degrees.

Optionally, in addition to the forward-facing and aft-facing positions, the seat is capable of assuming a first lounge position in which the seat bottom is oriented the same as it is in the forward-facing position, and the seat back extends upward at a predetermined angle relative to the seat bottom in the range of approximately 45 to 90 degrees. The seat may be further capable of assuming a second lounge position in which both the seat bottom and the seat back are rotated approximately 130 degrees about the base from their respective orientations in the first lounge position.

In yet another aspect, the invention relates to a boat that is capable of towing a water sports performer. The boat includes a hull having a bow, a stern, and starboard and port sides, which collectively define an interior of the boat. A control console and a plurality of seats are mounted within the interior of the boat. Included among the plurality of seats are a driver's seat, which is located behind the control console, and at least one passenger's seat, which comprises a reversible seat such as disclosed herein.

DETAILED DESCRIPTION OF THE PREFERRED EMBODIMENTS

Figure 1:
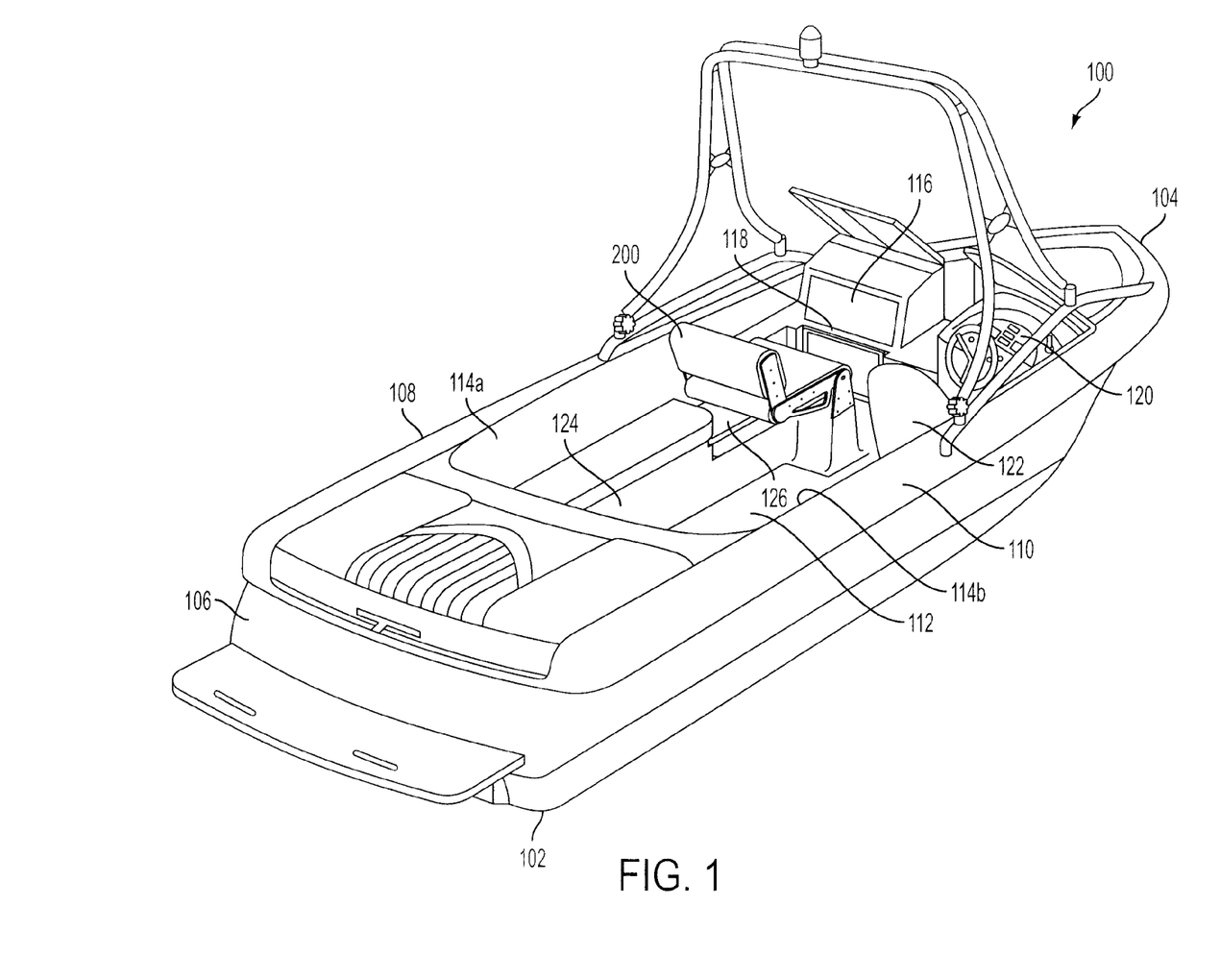
FIG. 1 shows a boat including a reversible seat according to a preferred embodiment of the invention.

FIG. 1 shows a boat 100 equipped with a reversible seat 200 in accordance with an exemplary preferred embodiment of the invention. The boat 100 includes a hull 102 with a bow 104, a stern 106, and port and starboard sides 108, 110. The bow 104, the stern 106, and the port and starboard sides 108, 110 collectively define an interior of the boat 100. Within the boat's interior there are a floor 112, port and starboard sidewalls 114a, 114b, a passenger-side console 116 having a horizontal ledge 118, and a driver-side control console 120. A driver's seat 122 is located behind the driver-side control console 120. The reversible seat 200, in this particular embodiment, serves as a passenger's seat and is located behind the passenger-side console 116, adjacent to the driver's seat 122. The boat 100 is further equipped with bench seating 124 along the port sidewall 114a.

The boat layout shown in FIG. 1 is merely exemplary, and the reversible seat could be incorporated in innumerable other boat configurations. Indeed, as noted above, the reversible seat could be incorporated in virtually any type of vehicle, including land, air, and water vehicles.

Figure 3:
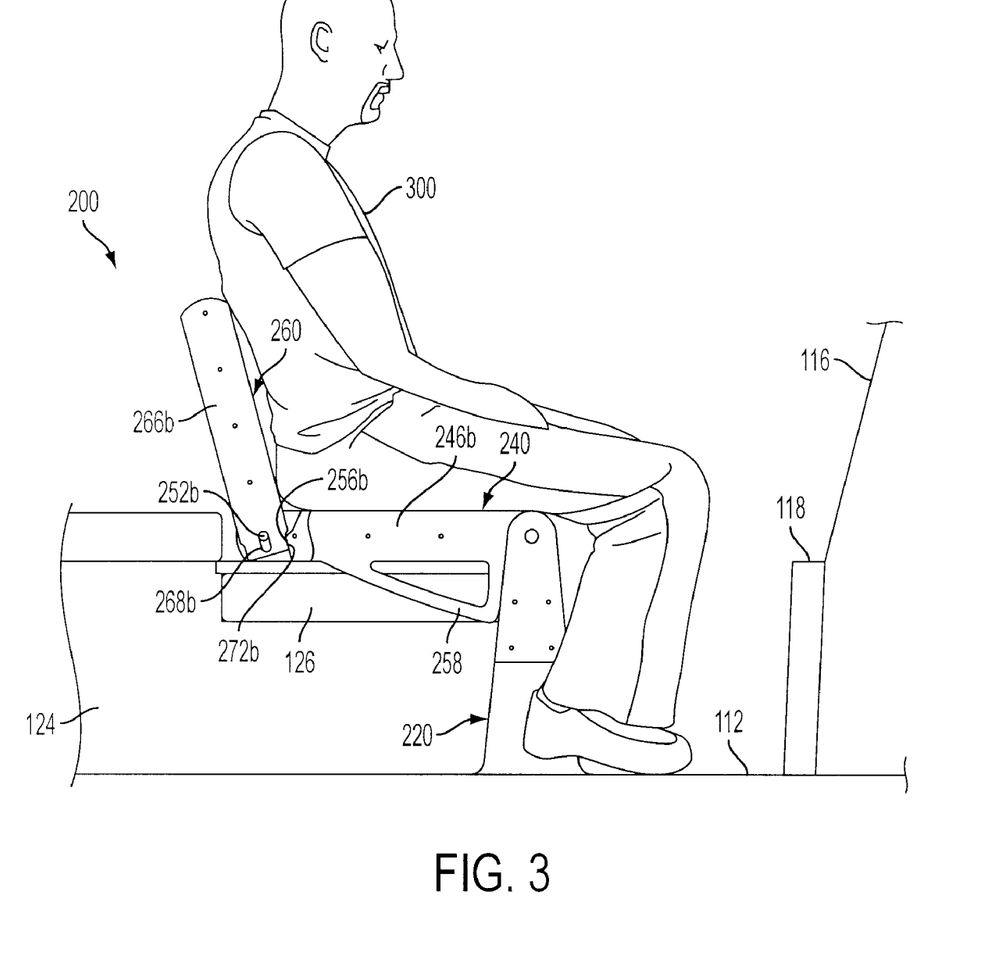
FIG. 3 is a side view of the reversible seat in a forward-facing position.

In FIG. 1, the reversible seat 200 is shown in a forward-facing position, such that a passenger 300 sitting in the seat 200 (as shown in FIG. 3) faces toward the bow 104. As will be described below with reference to FIGS. 4 and 5, the reversible seat 200 is also capable of assuming an aft-facing position, wherein the passenger 300 faces toward the stern 106. Those skilled in the art will appreciate that the reversible seat described herein could be oriented to face any pair of opposite directions. For example, the reversible seat could be oriented to alternately assume a port-facing position and a starboard-facing position.

Figure 2:
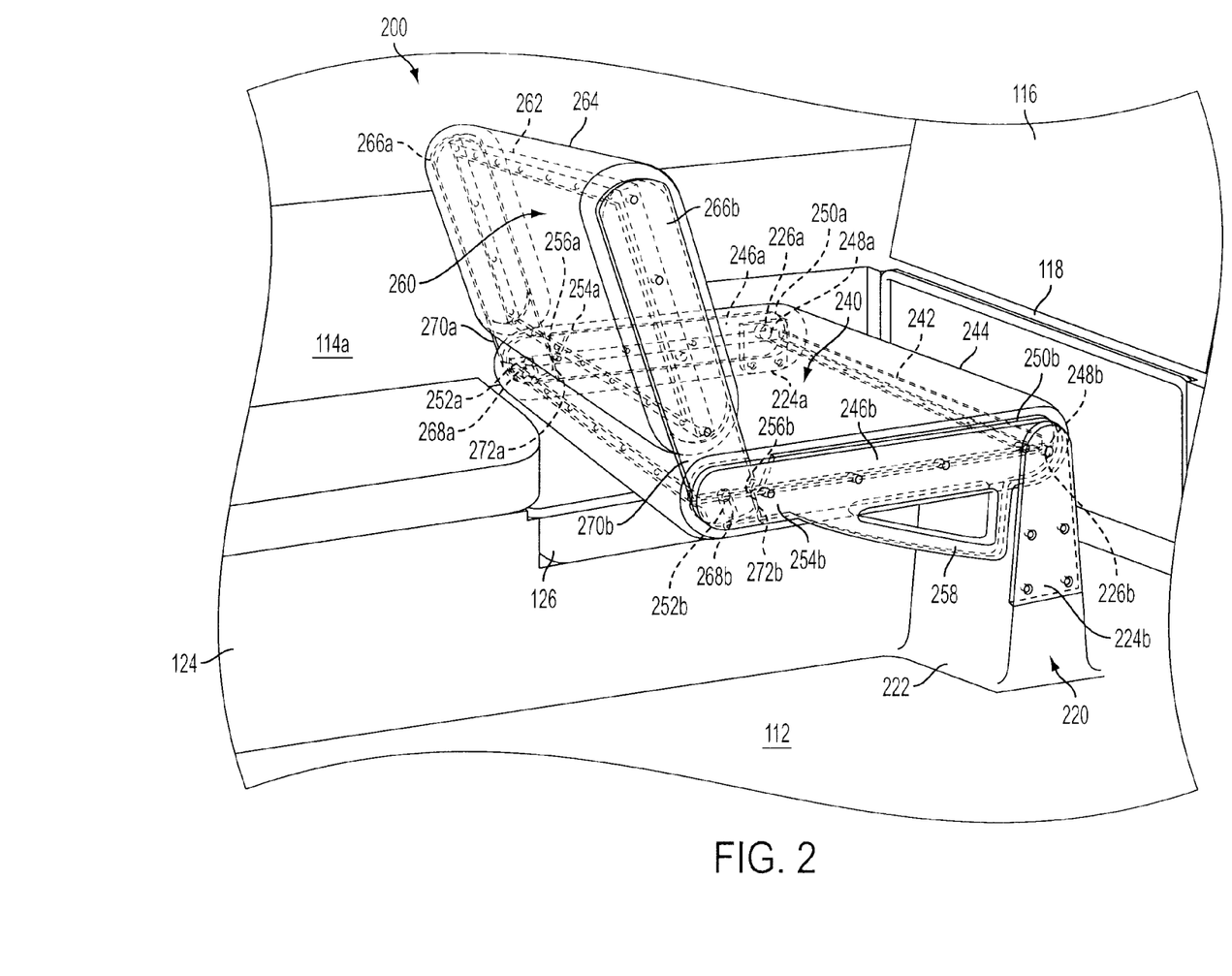
FIG. 2 is a detailed view of the reversible seat shown in FIG. 1.

FIG. 2 shows a preferred construction of the reversible seat 200, which, in main part, includes a base 220, a seat bottom 240, and a seat back 260.

The base 220 in this preferred embodiment includes a pedestal 222 rising up from the floor 112 of the boat 100 and a pair of brackets 224a, 224b flanking the pedestal 222. Each bracket 224a, 224b is provided with a cylindrical hole 226a, 226b, which extends either partly or all the way through the bracket 224a, 224b. In the embodiment shown in FIGS. 1 and 2, one bracket 224a is affixed to the port sidewall 114a of the boat 100 and the other bracket 224b is affixed to the pedestal 222.

Those skilled in the art will appreciate that any number of configurations for the base 220 are possible, depending on the environment in which the reversible seat 200 is installed. The brackets 224a, 224b need not be mounted to the port sidewall 114a and the pedestal 222, respectively, but instead can be mounted to virtually any part of the boat 100 by any suitable means of affixation. This includes, for example, bolts, screws, rivets, adhesives, welding, or the like. In fact, the base 220 need not include a pedestal 222 at all. All that is required of the base 220 is that it provides a pivot axis about which the seat bottom 240 can rotate.

The seat bottom 240 preferably includes an internal frame 242, a cushion 244, and a pair of external frame members 246a, 246b. Preferably, the cushion 244 surrounds at least the top, bottom, and front of the internal frame 242. This is because what is the upper surface of the seat bottom 240 in the forward-facing position becomes the lower surface in the aft-facing position, and what is the lower surface in the forward-facing position becomes the upper surface in the aft-facing position. The external frame members 246a, 246b are affixed to opposite sides of the internal frame 242, preferably by screws, bolts, rivets, or the like.

Similarly, the seat back 260 preferably includes an internal frame 262, a cushion 264, and a pair of external frame members 266a, 266b. Preferably, the cushion 264 surrounds at least the front and back surfaces of the internal frame 262. The external frame members 266a, 266b are affixed to opposite sides of the internal frame 262, preferably by screws, bolts, rivets, or the like.

An outwardly-facing, cylindrical projection 248a, 248b is provided on a forward portion 250a, 250b of each of the seat bottom external frame members 246a, 246b. An inwardly-facing, cylindrical projection 252a, 252b is provided on a rear portion 254a, 254b of each of the seat bottom external frame members 246a, 246b. Meanwhile, a slot 268a, 268b is formed in a lower portion 270a, 270b of each of the seat back external frame members 266a, 266b. The outwardly-facing projections 248a, 248b pivotally connect the seat bottom 240 to the holes 226a, 226b in the brackets 224a, 224b of the base 220. The inwardly-facing projections 252a, 252b pivotally connect the seat bottom 240 to the slots 268a, 268b in the seat back external frame members 266a, 266b, thereby providing a "slide-and-pivot" connection between the seat bottom 240 and the seat back 260. In this manner, the seat back 260 is pivotally connected to a side of the seat bottom 240 opposite from where the seat bottom 240 is pivotally connected to the base 220.

Those skilled in the art will appreciate that the respective positions of the projections 248a, 248b, 252a, 252b, on the one hand, and the holes 226a, 226b and slots 268a, 268b, on the other hand, could be reversed. Thus, for example, the seat bottom external frame members 246a, 246b could be provided with holes and/or slots, while the brackets 224a, 224b and/or the seat back external frame members 266a, 266b could be provided with projections. Or, instead of projections, a rod (not shown) could extend all the way through the seat bottom 240 and/or the seat back 260.

The rear portions 254a, 254b of each of the seat bottom external frame members 246a, 246b include cammed surfaces 256a, 256b. Similarly, the lower portions 270a, 270b of each of the seat back external frame members 266a, 266b include cammed surfaces 272a, 272b. The cammed surfaces 256a, 256b of the seat bottom external frame members 246a, 246b are designed to engage the cammed surfaces 272a, 272b of the seat back external frame members 266a, 266b in order to maintain the desired angle between the seat bottom 240 and the seat back 260 in the different positions that the reversible seat 200 can assume, as will be explained below. Although in the preferred embodiment shown in FIG. 2 the cammed surfaces 256a, 256b, 272a, 272b are provided on each of the external frame members 246a, 246b, 266a, 266b, they could be provided on only two of the external frame members 246a, 266a or 246b, 266b.

In the particular embodiment shown in FIGS. 1 and 2, seat bottom external frame member 246b is provided with a triangular-shaped brace 258. This brace 258 serves two purposes: In the forward-facing position, the brace 258 abuts against the base 220 and thus supports the seat bottom 240 in a substantially horizontal orientation (i.e., substantially parallel to the floor 112). In the aft-facing position, the brace 258 serves as a handle or side rail for the reversible seat 200.

In the preferred embodiment shown, only one of the seat bottom external frame members (246b) is provided with a brace. In the forward-facing position, the other side of the seat bottom 240 rests on the bench seating 124. Depending on the environment in which the seat 200 is installed, no brace may be necessary. Or, alternatively, a brace could be provided on both of the seat bottom external frame members 246a, 246b.

Also, depending on the environment, braces could be provided on both sides (i.e., top and bottom) of the seat bottom external frame members 246a, 246b, instead of on only one side.

The reversible seat 200 depicted in the drawings has a rectangular seat bottom 240 and seat back 260, and is designed to accommodate a single passenger. Those skilled in the art will appreciate that other shapes and sizes for the seat bottom 240 and the seat back 260 are possible, and that the seat 200 could easily be designed to accommodate multiple passengers.

As for preferred materials, the pedestal 222 preferably is constructed of fiberglass, which is the same material used for the boat's floor 112 and port and starboard sidewalls 114a, 114b. The brackets 224a, 224b, and external frame members 246a, 246b, 266a, 266b preferably are constructed of aluminum while portions of the brackets and external frame members that contact each other (e.g., projections 248a, 248b, 252a, 252b, holes 226a, 226b, slots 268a, 268b, and cammed surfaces 256a, 256b, 272a, 272b) advantageously may be constructed of or lined or covered with Delrin. The internal frames 242, 262 preferably are constructed of aluminum and plastic. The cushions 244, 264 preferably are covered in a durable material, such as vinyl, and stuffed with a resilient foam material, such as polyurethane foam.

FIG. 3 shows the reversible seat 200 in the forward-facing position. A portion of the seat bottom external frame member 246b has been cut away in FIG. 3 (and also in FIGS. 4-9) in order to illustrate how cammed surface 256b and cammed surface 272b engage each other to maintain the desired angle between the seat bottom 240 and the seat back 260. Preferably, in the forward-facing position, the angle between the seat bottom 240 and the seat back 260 is in the range of approximately 90 to 135 degrees, more preferably in the range of approximately 95 to 115 degrees, and most preferably approximately 105 degrees. As noted above, the seat bottom 240 is maintained in a substantially horizontal orientation by virtue of the brace 258 abutting against the base 220 and the seat bottom 240 resting upon the bench seating 124. The bench seating 124 may include a reversible cushion 126 (i.e., a cushion having one rigid side and one cushioned side) below the seat bottom 240, in order to provide a rigid support surface when the seat 200 is in the forward-facing position, and a cushioned surface when the seat 200 is in the aft-facing position.

Figure 4:
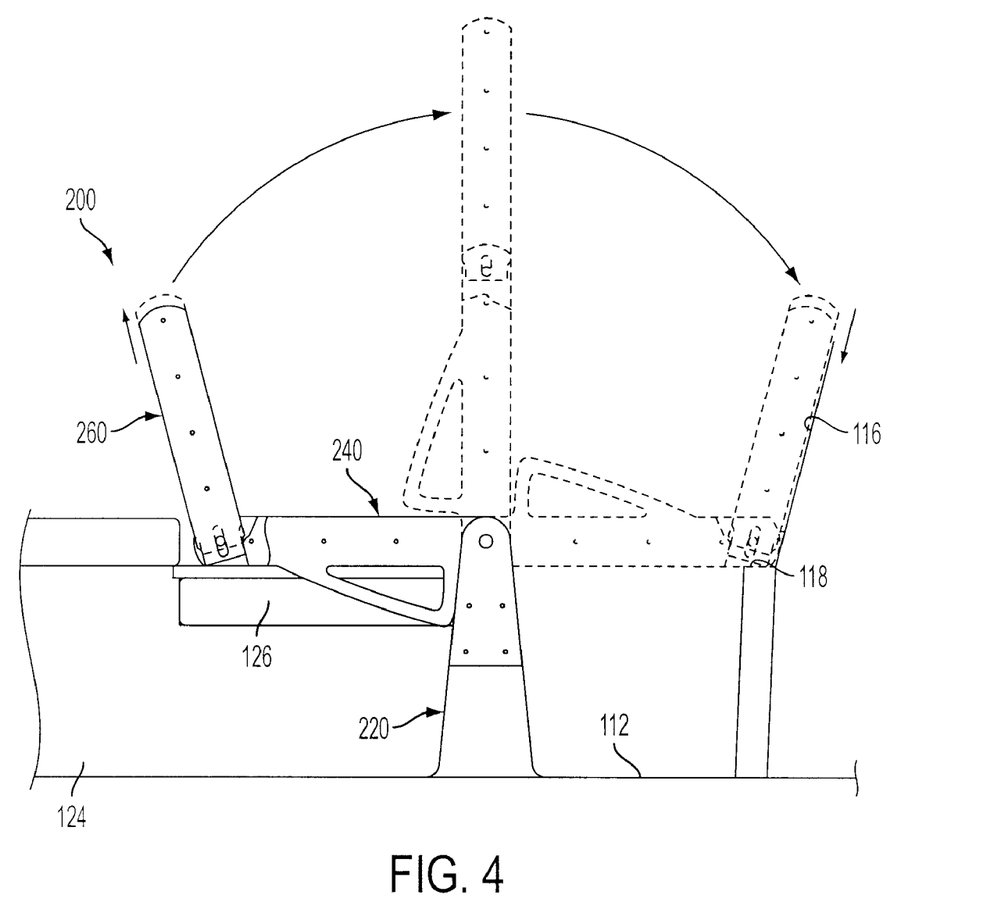
FIG. 4 shows how the reversible seat can be moved from the forward-facing position to an aft-facing position.

FIG. 4 illustrates how the reversible seat 200 can be moved from the forward-facing position to the aft-facing position. This is done by first lifting the seat back 260 upward (to the extent the slide-and-pivot connection permits) so that the cammed surfaces 256b, 272b disengage. Next, the seat back 260 and the seat bottom 240 are rotated forward (clockwise in FIG. 4). Once the seat bottom 240 has rotated approximately 180 degrees about the base 220 from where it was in the forward-facing position, the seat bottom 240 comes to rest on the ledge 118 of the passenger-side console 116. The seat back 260 then is lowered so that the cammed surfaces 256b, 272b once again engage each other.

Figure 5:
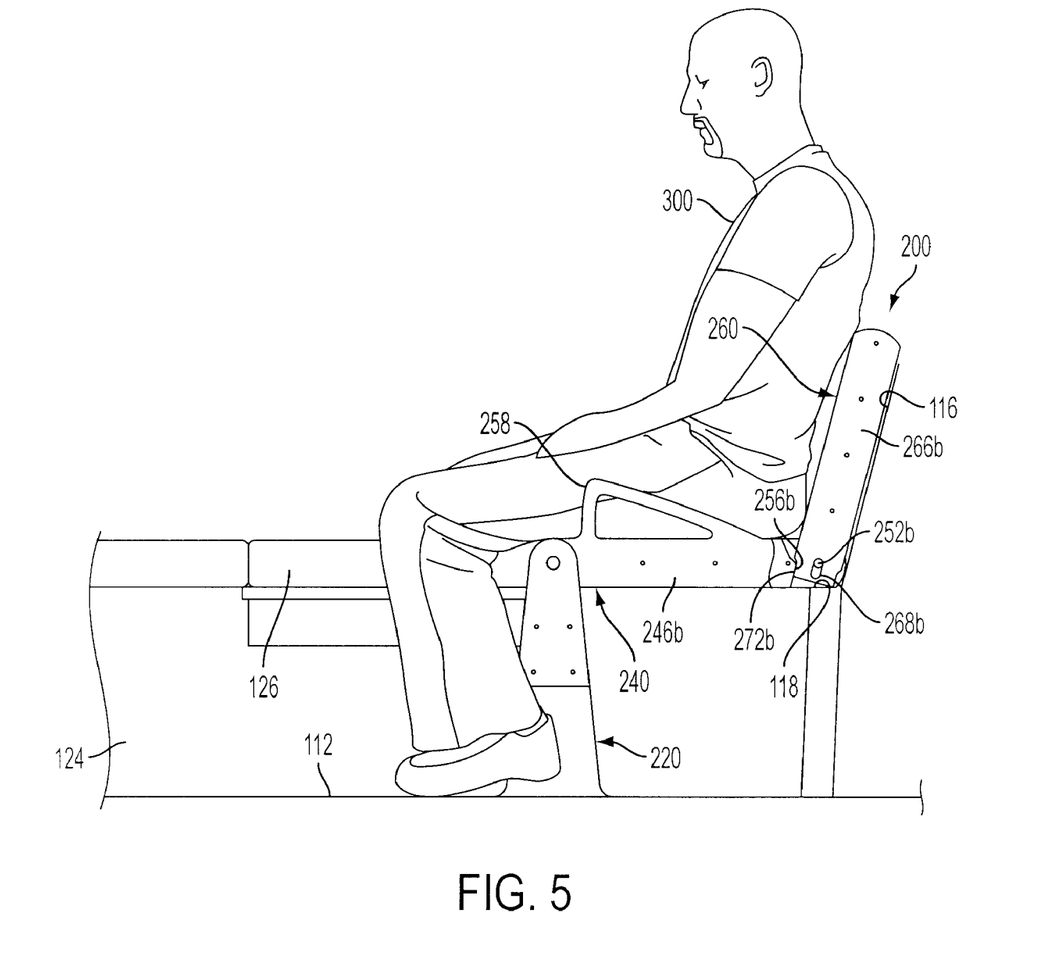
FIG. 5 is a side view of the reversible seat in the aft-facing position.

FIG. 5 shows the reversible seat 200 in the aft-facing position. In this position, cammed surfaces 256b, 272b engage each other to maintain the desired angle between the seat bottom 240 and the seat back 260. Preferably, in the aft-facing position, the angle between the seat bottom 240 and the seat back 260 is in the range of approximately 90 to 135 degrees, more preferably in the range of approximately 95 to 115 degrees, and most preferably approximately 105 degrees. In the aft-facing position, the seat bottom 240 is maintained in a substantially horizontal orientation by virtue of resting upon the ledge 118. Alternatively, as noted above, one or more braces could be provided to support the seat bottom 240 in a substantially horizontal orientation.

Figure 6:
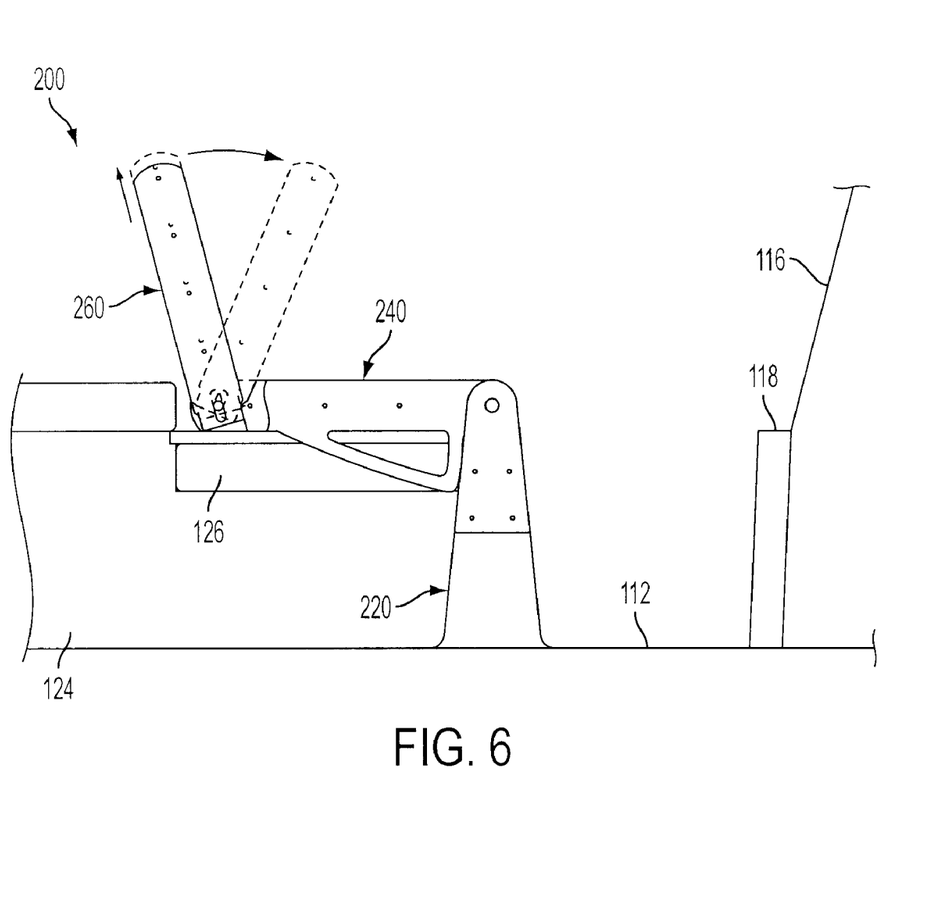
FIG. 6 shows how the reversible seat can be moved from the forward-facing position to a first lounge position.

Optionally, the reversible seat 200 can further assume one or more lounge positions. For example, it is possible to move the seat 200 from the forward-facing position to a first lounge position, as depicted in FIG. 6. This is done by lifting the seat back 260 upward and then rotating it forward (clockwise in FIG. 6).

Figure 7:
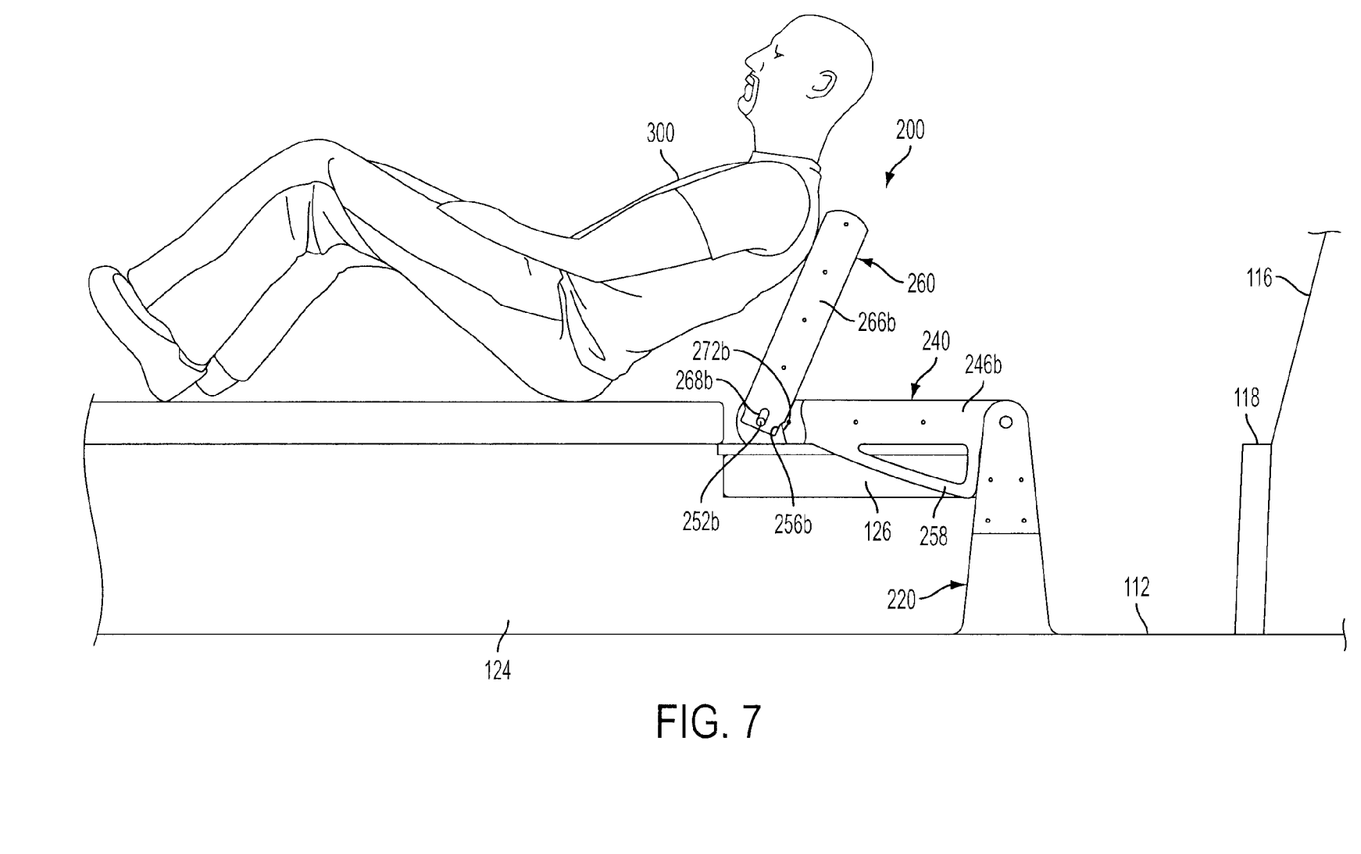
FIG. 7 is a side view of the reversible seat in the first lounge position.

FIG. 7 shows the reversible seat 200 in the first lounge position. In this position, the passenger 300 can face backward while sitting on the bench seating 124 and reclining against the seat back 260. Cammed surfaces 256b and 272b are engaged to prevent the seat back 260 from rotating too far forward. Preferably, in the first lounge position, the angle between the seat bottom 240 and the seat back 260 is in the range of approximately 45 to 90 degrees, more preferably in the range of approximately 65 to 85 degrees, and most preferably approximately 75 degrees.

Figure 8:
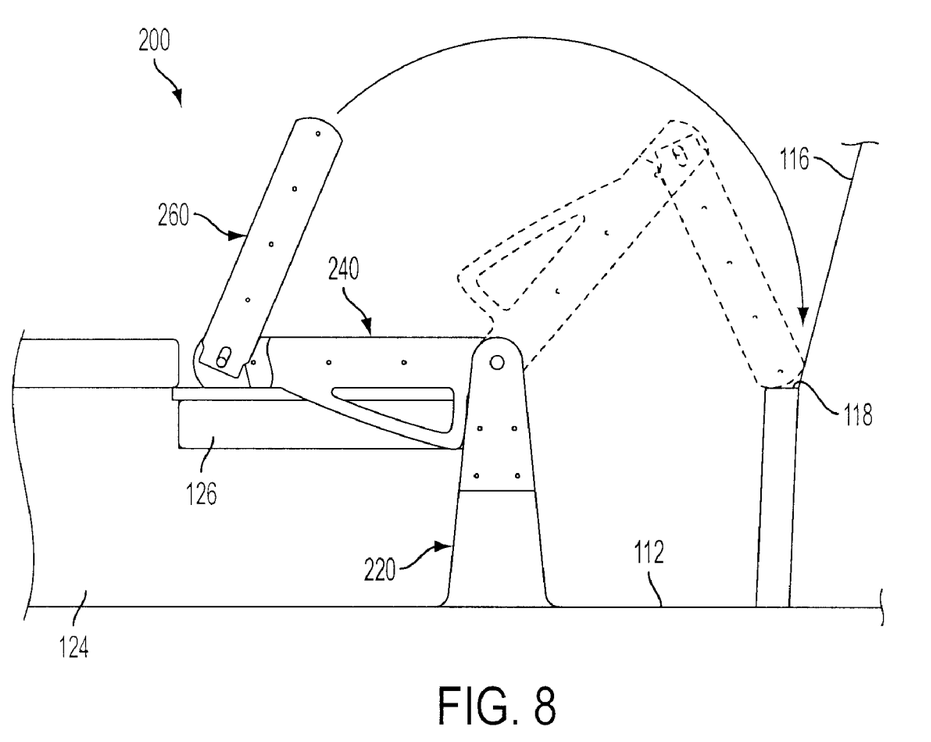
FIG. 8 shows how the reversible seat can be moved from the first lounge position to a second lounge position.

FIG. 8 illustrates how the reversible seat 200 can be moved from the first lounge position to a second lounge position. This is done by rotating both the seat bottom 240 and the seat back 260 forward (clockwise in FIG. 8) by approximately 130 degrees until the seat back 260 comes to rest on the ledge 118.

Figure 9:
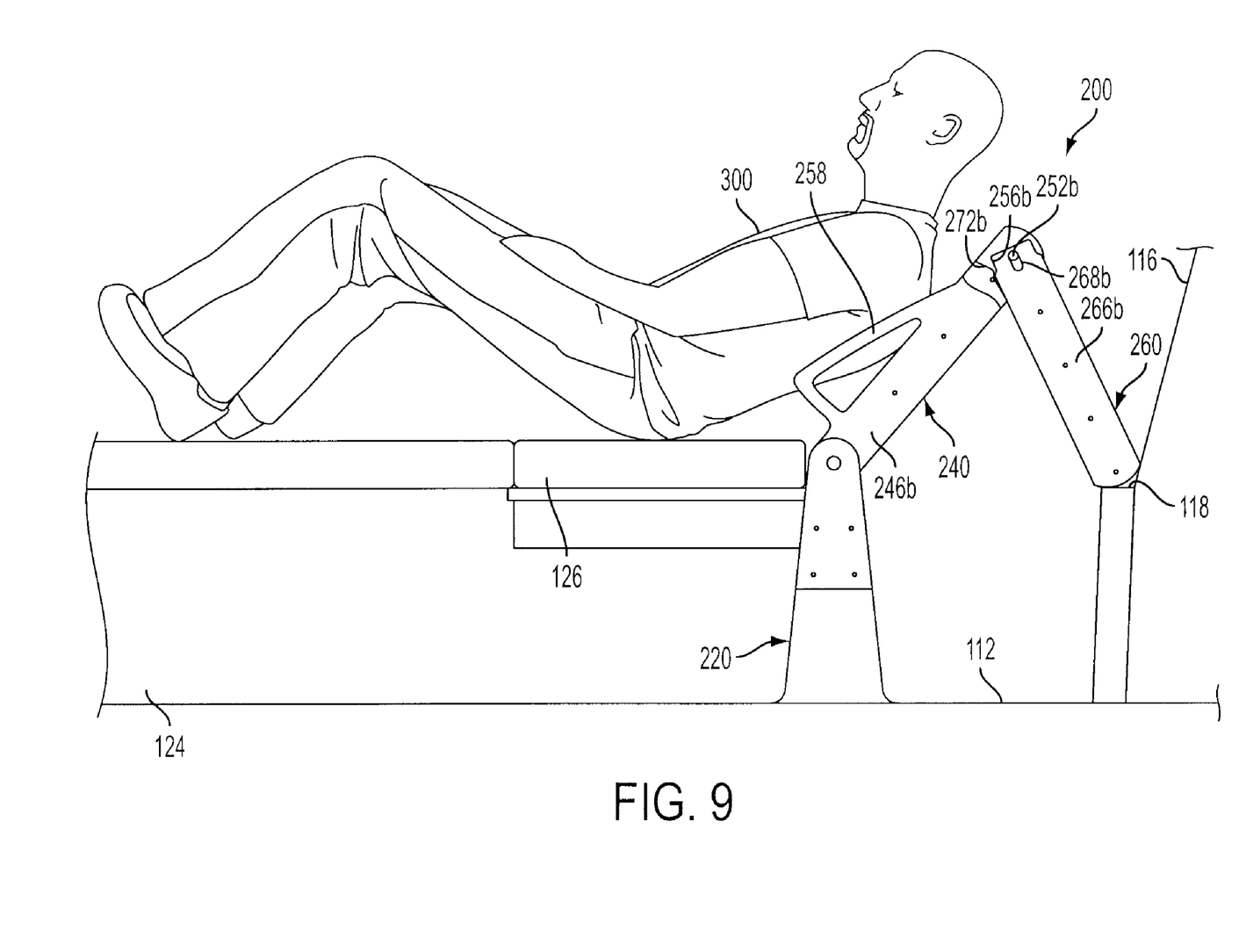
FIG. 9 is a side view of the reversible seat in the second lounge position.

FIG. 9 shows the reversible seat 200 in the second lounge position. In this position, the passenger 300 can face backward while sitting on the bench seating 124 and reclining against the seat bottom 240.

The embodiments discussed herein are representative of preferred embodiments of the present invention and are provided for illustrative purposes only. They are not intended to limit the scope of the invention. Although specific configurations, structures, materials, etc. have been shown and described, such are not limiting. Modifications and variations are contemplated within the scope of the invention, which is intended to be limited only by the scope of the accompanying claims.

What is claimed is:

1. A reversible seat for a vehicle, the seat being capable of assuming at least a first position and a second position, the seat comprising:

a base;

a seat bottom having a first surface and a second, opposite surface, the seat bottom being pivotally connected to the base such that the seat bottom is capable of rotating at least approximately 180 degrees about the base; and a seat back pivotally connected to the seat bottom on a side of the seat bottom opposite from where the seat bottom is pivotally connected to the base, wherein, (i) in a first position, the first surface of the seat bottom faces substantially upward and the second surface of the seat bottom faces substantially downward, (ii) in a second position, the second surface of the seat bottom faces substantially upward and the first surface of the seat bottom faces substantially downward, and (iii) in each of the first and second positions, the seat back extends upward at a predetermined angle relative to the seat bottom.

2. The seat of claim 1, wherein (i) in the first position, the seat bottom is oriented substantially horizontally and the predetermined angle between the seat bottom and the seat back is in a range of approximately 90 to 135 degrees, and (ii) in the second position, the seat bottom is oriented substantially horizontally and is rotated approximately 180 degrees about the base from its orientation in the first position, and the predetermined angle between the seat bottom and the seat back is in the range of approximately 90 to 135 degrees.

3. The seat of claim 1, wherein in each of the first and second positions, the predetermined angle between the seat bottom and the seat back is in the range of approximately 95 to 115 degrees.

4. The seat of claim 2, wherein each of the seat bottom and the seat back includes at least one cammed surface, and the cammed surfaces of the seat bottom and the seat back engage each other to maintain the predetermined angle between the seat bottom and the seat back in each of the first and second positions.

5. The seat of claim 4, wherein the seat back is pivotally connected to the seat bottom by a slide-and-pivot connection, and the seat back must first be lifted upward before being rotated relative to the seat bottom when moving the seat from the first position to the second position, or vice versa.

6. The seat of claim 2, wherein the seat is capable of assuming a third position in which the seat bottom is oriented the same as it is in the first position, and the seat back extends upward at a predetermined angle relative to the seat bottom in the range of approximately 45 to 90 degrees.

7. The seat of claim 6, wherein the seat is capable of assuming a fourth position in which both the seat bottom and the seat back are rotated approximately 130 degrees about the base from their respective orientations in the third position.

8. A reversible seat for a boat, the seat being capable of assuming at least a forward-facing position and an aft-facing position, the seat comprising:
   a base;
   a seat bottom pivotally connected to the base; and
   a seat back pivotally connected to the seat bottom on a side of the seat bottom opposite from where the seat bottom is pivotally connected to the base,
   wherein, (i) in a forward-facing position, the seat bottom is oriented substantially horizontally and the seat back extends upward at a predetermined angle relative to the seat bottom in a range of approximately 90 to 135 degrees, and (ii) in an aft-facing position, the seat bottom is oriented substantially horizontally and is rotated approximately 180 degrees about the base from its orientation in the forward-facing position, and the seat back extends upward at a predetermined angle relative to the seat bottom in the range of approximately 90 to 135 degrees.

9. The seat of claim 8, wherein in each of the forward-facing and aft-facing positions, the predetermined angle between the seat bottom and the seat back is in the range of approximately 95 to 115 degrees.

10. The seat of claim 8, further comprising means for releasably maintaining the predetermined angle of the seat back relative to the seat bottom in each of the forward-facing and aft-facing positions.

11. The seat of claim 10, wherein the means for releasably maintaining the predetermined angle of the seat back relative to the seat bottom includes at least one cammed surface on the seat bottom, at least one cammed surface on the seat back, and at least one slide-and-pivot connection between the seat bottom and the seat back.

12. The seat of claim 8, wherein each of the seat bottom and the seat back includes at least one cammed surface, and the cammed surfaces of the seat bottom and the seat back engage each other to maintain the predetermined angle between the seat bottom and the seat back in each of the forward-facing and aft-facing positions.

13. The seat of claim 12, wherein the seat back is pivotally connected to the seat bottom by at least one slide-and-pivot connection.

14. The seat of claim 13, wherein the seat back must first be lifted upward before being rotated relative to the seat bottom when moving the seat from the forward-facing position to the aft-facing position, or vice versa.

15. The seat of claim 8, wherein, in addition to the forward-facing and aft-facing positions, the seat is capable of assuming a first lounge position in which the seat bottom is oriented the same as it is in the forward-facing position, and the seat back extends upward at a predetermined angle relative to the seat bottom in the range of approximately 45 to 90 degrees.

16. The seat of claim 15, wherein the seat is further capable of assuming a second lounge position in which both the seat bottom and the seat back are rotated approximately 130 degrees about the base from their respective orientations in the first lounge position.

17. A boat capable of towing a water sports performer, the boat comprising:
   a hull including a bow, a stern, and starboard and port sides, which collectively define an interior of the boat;
   a control console mounted within the interior of the boat; and
   a plurality of seats mounted within the interior of the boat, including a driver's seat located behind the control console and at least one passenger's seat,
   wherein the passenger's seat is capable of assuming at least a forward-facing position and an aft-facing position and includes:
      a base mounted within the interior of the boat;
      a seat bottom pivotally connected to the base; and
      a seat back pivotally connected to the seat bottom on a side of the seat bottom opposite from where the seat bottom is pivotally connected to the base,
      wherein, (i) in a forward-facing position, the seat bottom is oriented substantially horizontally and the seat back extends upward at a predetermined angle relative to the seat bottom in a range of approximately 90 to 135 degrees, and (ii) in an aft-facing position position, the seat bottom is oriented substantially horizontally and is rotated approximately 180 degrees about the base from its orientation in the forward-facing position, and the seat back extends upward at a predetermined angle relative to the seat bottom in the range of approximately 90 to 135 degrees.

18. The boat of claim 17, wherein in each of the passenger's seat's forward-facing and aft-facing positions, the predetermined angle between the seat bottom and the seat back is in the range of approximately 95 to 115 degrees.

19. The boat of claim 17, wherein, in addition to the forward-facing and aft-facing positions, the passenger's seat is capable of assuming a first lounge position in which the seat bottom is oriented the same as it is in the forward-facing position, and the seat back extends upward at a predetermined angle relative to the seat bottom in the range of approximately 45 to 90 degrees.

20. The boat of claim 19, wherein the passenger's seat is further capable of assuming a second lounge position in which both the seat bottom and the seat back are rotated approximately 130 degrees about the base from their respective orientations in the first lounge position.

* * * * *